(12) United States Patent
Wendel

(10) Patent No.: US 8,838,334 B2
(45) Date of Patent: Sep. 16, 2014

(54) DEVICE FOR DETECTING AND TRACKING MOTOR VEHICLES

(75) Inventor: Jan Wendel, Munich (DE)

(73) Assignee: Astrium GmbH, Taufkirchen (DE)

( * ) Notice: Subject to any disclaimer, the term of this patent is extended or adjusted under 35 U.S.C. 154(b) by 132 days.

(21) Appl. No.: 13/517,706

(22) Filed: Jun. 14, 2012

(65) Prior Publication Data

US 2012/0323438 A1 Dec. 20, 2012

(30) Foreign Application Priority Data

Jun. 15, 2011 (DE) .......................... 10 2011 106 507

(51) Int. Cl.
*G01S 19/16* (2010.01)
*G01S 19/21* (2010.01)
*G06F 7/00* (2006.01)

(52) U.S. Cl.
USPC .................. 701/36; 342/357.54; 342/357.59; 340/988

(58) Field of Classification Search
USPC ............. 701/36; 342/357.02, 357.54, 357.59; 340/988
See application file for complete search history.

(56) References Cited

U.S. PATENT DOCUMENTS

| | | | |
|---|---|---|---|
| 6,240,365 B1 | 5/2001 | Bunn | |
| 7,315,239 B2* | 1/2008 | Cheng et al. | 340/436 |
| 7,495,604 B2* | 2/2009 | Yamano et al. | 342/107 |
| 7,512,492 B2* | 3/2009 | Irvin et al. | 701/473 |
| 7,574,215 B1* | 8/2009 | Fan et al. | 455/456.1 |
| 7,756,611 B2* | 7/2010 | Sugiura | 701/1 |
| 7,884,762 B2* | 2/2011 | Abraham | 342/357.64 |
| 8,068,984 B2* | 11/2011 | Smith et al. | 701/472 |
| 8,368,580 B2* | 2/2013 | Manela et al. | 342/13 |
| 2004/0119638 A1* | 6/2004 | Fagan et al. | 342/357.03 |
| 2004/0263421 A1* | 12/2004 | Schaffner et al. | 343/911 L |
| 2010/0103989 A1* | 4/2010 | Smith et al. | 375/150 |
| 2010/0156706 A1* | 6/2010 | Farmer et al. | 342/357.1 |
| 2010/0171659 A1* | 7/2010 | Waters et al. | 342/357.12 |
| 2010/0177678 A1* | 7/2010 | Sayegh | 370/315 |
| 2011/0004513 A1* | 1/2011 | Hoffberg | 705/14.1 |
| 2011/0037644 A1* | 2/2011 | Yeshayahu | 342/357.25 |
| 2011/0202204 A1* | 8/2011 | Kahn | 701/3 |
| 2011/0213529 A1* | 9/2011 | Krause et al. | 701/50 |
| 2012/0200455 A1* | 8/2012 | Papagerogiou | 342/357.25 |

FOREIGN PATENT DOCUMENTS

| | | |
|---|---|---|
| EP | 1 363 421 A2 | 11/2003 |
| EP | 1 489 432 A1 | 12/2004 |
| EP | 1496619 A1 * | 1/2005 |
| GB | 2325347 B * | 7/2002 |

OTHER PUBLICATIONS

European Search Report with partial English Translation dated Sep. 26, 2012 (Eight (8) pages).

* cited by examiner

*Primary Examiner* — Tuan C. To
(74) *Attorney, Agent, or Firm* — Crowell & Moring LLP

(57) ABSTRACT

A device for detecting and tracking vehicles includes a position-determining device for determining a current vehicle position, a transmitting device for transmitting the current vehicle position to a receiver via a communication channel, and a device for detecting an activated interfering transmitter and for triggering an action depending on the detection of an activated interfering transmitter.

14 Claims, 1 Drawing Sheet

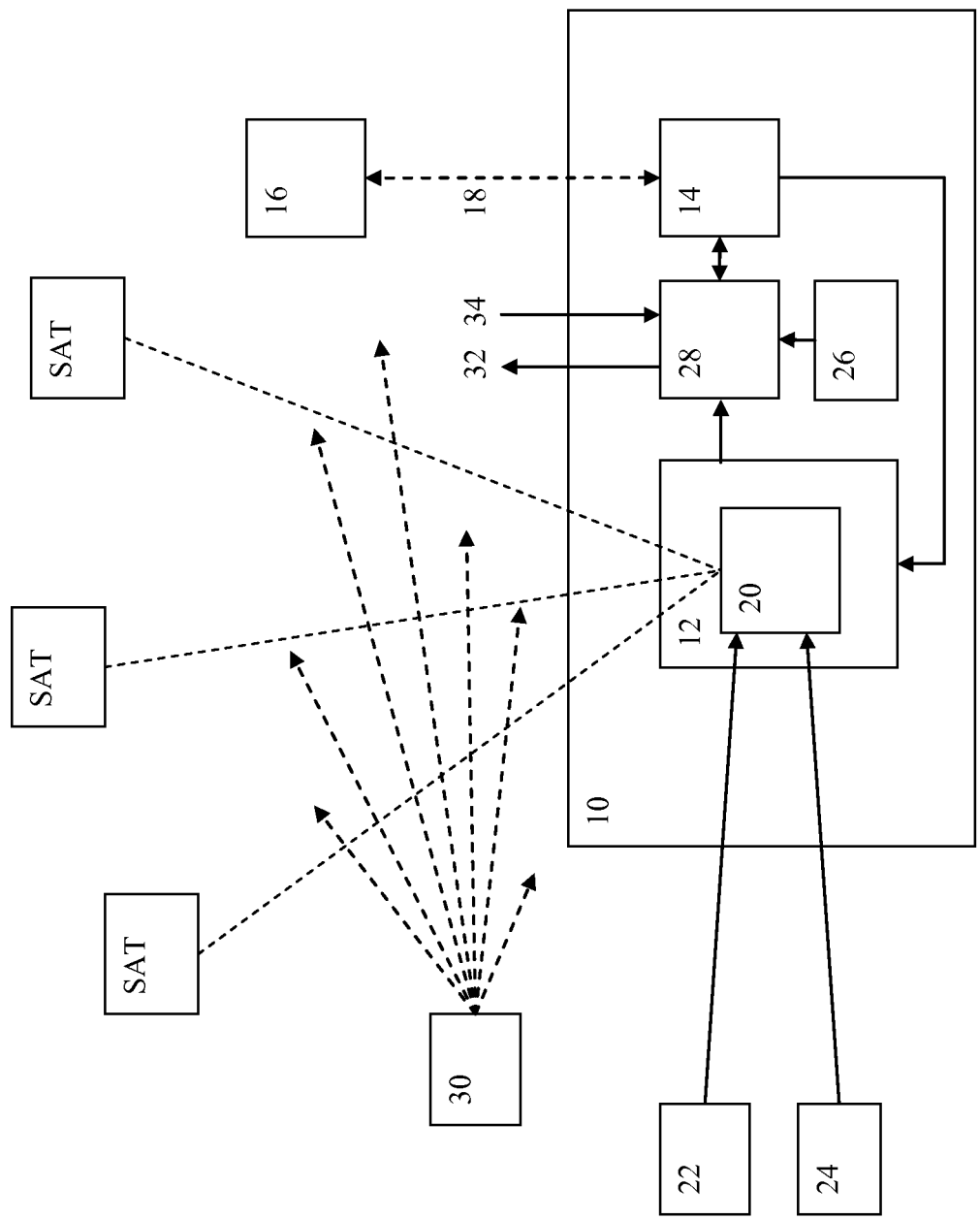

DEVICE FOR DETECTING AND TRACKING MOTOR VEHICLES

CROSS-REFERENCE TO RELATED APPLICATIONS

The present application claims priority under 35 U.S.C. §119 to German Patent Application No. 10 2011 106 507.9, filed Jun. 15, 2011, the entire disclosure of which is herein expressly incorporated by reference.

BACKGROUND AND SUMMARY OF THE INVENTION

In order to detect and track purloined, in particular, stolen vehicles (e.g., passenger cars and trucks, ships or airplanes), detecting and tracking devices are used that are able to report the momentarily determined global position of a vehicle via distance communication connection, for example by means of a mobile radio system such as GSM (Global System for Mobile Communication), to a detecting and tracking service.

The detecting and tracking devices predominantly use satellite navigation systems GNSS (Global Navigation Satellite System), such as the globally available GPS (Global Positioning System), for determining the global position. In the future, it will also be possible to use the European satellite navigation system GALILEO for this purpose. The momentarily determined global position of a vehicle can be transmitted either on request of the detecting and tracking service or automatically upon a certain event, for example the activation of an alarm system in the vehicle, from a detecting or tracking device to the service.

In order to prevent the detection of the vehicle, so-called jammers such as, for example, GPS jammers are increasingly used. Jammers are interfering transmitters that prevent the reception of navigation signals of a satellite navigation system from detection. Jammers can also be designed such that not only the reception of navigation signals, but also of mobile radio signals is disturbed so that a detecting and tracking device cannot receive mobile radio signals from a detecting and tracking service and, for example, cannot receive requests for information about the actual position transmitted via mobile radio from such services.

Alternatively, it is also possible to use spoofing transmitters in order to prevent accurate vehicle detection. Spoofing transmitters interfere with the detection by transmitting falsified imitated navigation signals. GPS spoofing transmitter generate GPS signals with formally valid but wrong position data. Usually, spoofing is more complicated than jamming because generating falsified navigation signals currently requires a high level of technical effort.

Jammers and spoofing transmitters are generally designated here as interfering transmitters.

Exemplary embodiments of the present invention are directed to improvements in devices for detecting and tracking vehicles that use satellite navigation.

In accordance with exemplary embodiments of the present invention, a device provided for detecting and tracking vehicles, which is in particular based on satellite navigation, is extended in such a manner that the device itself is able to detect an interfering transmitter such as an activated jammer and/or a spoofing transmitter. For detecting an interfering transmitter causing jamming and/or spoofing, according to the invention, one or a plurality of different measures can be used alternatively or in some cases also combined:

- a receiver used in a position-determining device for position-determining signals such as navigation signals of a satellite navigation system, for example, can monitor one or a plurality of receive parameters of received position-determining signals in order to detect an interfering transmitter that influences these parameters;
- the receiver for position-determining signals can also detect an interfering transmitter due to the fact that the receiver is not able to perform a position determination for a predetermined time period because this is an indication of the use of an interfering jamming transmitter;
- measurements of the receiver for position-determining signals can also be checked for consistency, in particular in the case of navigation signals of a satellite navigation system using known integrity monitoring technologies such as RAIM (Receiver Autonomous Integrity Monitoring) through which signals of interfering spoofing transmitters can be identified;
- measurements of the receiver for position-determining signals can also be compared with measurements of other sensors such as a distance meter or a speedometer in order to be able to identify significant deviations which indicate the use of an interfering spoofing transmitter;
- finally, it is also possible to use a device (jammer/spoofing detector) suitable specifically for detecting jammers and/or spoofing transmitters.

The invention has the advantage that despite the use of interfering transmitters, detecting a stolen vehicle is possible in most situations. Furthermore, when detecting an interfering transmitter, the invention enables initiation of further measures that make it difficult to steal a vehicle or even can prevent it. Detection of an active interfering transmitter, in particular of a jammer or spoofing transmitter, according to the invention improves detection and tracking of vehicles in different ways. For example, a vehicle detecting and tracking service can be informed about the detection of the interfering transmitter, in particular by means of a mobile radio connection, since interfering transmitters usually can only interfere with receiving but not with transmitting radio signals. Also, a detected interfering transmitter can trigger a certain action, for example blocking a stolen vehicle, switching to another communication channel for receiving signals for the detection, or considering an alternative detection method, for example by means of mobile radio.

One exemplary embodiment of the invention relates to a detecting and tracking device for vehicles comprising a position-determining device for determining a current vehicle position, a transmitting device for transmitting the current vehicle position via a communication channel to a receiver, and means for detecting an activated interfering transmitter and for triggering an action depending on the detection of an activated interfering transmitter.

The means for detecting an activated interfering transmitter can have a receiver for position-determining signals, in particular navigation signals, integrated in the position-determining device, wherein the receiver is configured for monitoring one or a plurality of received position-determining signals in order to detect an interfering transmitter influencing these parameters. For example, one or a plurality of receiver-internal measured values of navigation signals, for example GPS signals, which are relevant for tracking and/or capturing navigation signals, can be monitored such as the receive signal strength, the carrier-to-noise density ratio, the statistical distribution of samples or other measured values provided by a front end of the receiver. Since mainly jamming influences such measured values, it is possible to detect in particular jamming transmitters.

The means for detecting an activated interfering transmitter can also have a receiver for position-determining signals, in particular navigation signals of a satellite navigation system, which receiver is integrated in the position-determining device, wherein the receiver is configured for detecting an interfering transmitter due to the fact that during a predetermined time period, the receiver cannot perform a position determination. Because jamming transmitters interfere with the reception of navigation signals to such a great extent that during active jamming, no position determination is possible, it is therefore possible to detect mainly jamming transmitters.

The means for detecting an activated interfering transmitter can further comprise a receiver for position-determining signals, in particular navigation signals of a satellite navigation system, which receiver is integrated in the position-determining device, wherein the receiver is configured for checking measurements of position-determining signals for consistency, in particular by using a RAIM (Receiver Autonomous Integrity Monitoring) technology. With RAIM technologies it is possible to check received navigation signals for integrity, to detect wrong navigation signals and to exclude them from position determination. This technology is therefore particularly well suited for detecting spoofing transmitters. However, it is also suitable for detecting jamming transmitters when, for example, navigation signals are received which are disturbed and, in particular, falsified by jamming.

The means for detecting an activated interfering transmitter can also comprise a receiver for position-determining signals, in particular navigation signals of a satellite navigation system, which receiver is integrated in the position-determining device, wherein the receiver is configured for comparing measurements of position-determining signals with measurements of other sensors, in particular a distance meter and/or a speedometer in order to be able to identify significant deviations which indicate the use of an interfering transmitter, in particular of a spoofing transmitter. If, for example, a significant deviation of a vehicle speed determined with a speedometer from the vehicle speed determined by means of navigation signals, in particular GPS signals, occurs, this can be an indication of a spoofing transmitter which transmits falsified navigation signals.

The means for detecting an activated interfering transmitter can also comprise a device specifically suited for detecting interfering transmitters, for example a jamming/spoofing detector.

The means for triggering an action depending on the detection of an activated interfering transmitter can be configured for transmitting with the transmitting device a message about a detected interfering transmitter via the communication channel, in particular a mobile radio channel. For example, the message can be used for determining an approximate current position of a vehicle, for example with one of the known methods used in mobile radio systems for determining the position of mobile radio subscribers. The message can also include data about the current vehicle position which has been determined in a different manner, for example via a distance measurement or detection via mobile radio signals.

The means for triggering an action depending on the detection of an activated interfering transmitter can also be configured for initiating a vehicle blockage. For example, an immobilizer can be activated when an interfering transmitter has been detected, or the engine of the vehicle can be turned off and the engine control can be deactivated.

The means for triggering an action depending on the detection of an activated interfering transmitter can further be configured for requesting authentication for releasing the vehicle blockage. For example, after a vehicle blockage due to a detected interfering transmitter, a message that the vehicle is blocked and that entering a code is required for releasing the blockage can be displayed on a display device of the vehicle.

Furthermore, one embodiment of the invention relates to the use of a device according to the invention and as described above in an object, in particular a vehicle, for detecting and tracking the object. Although the device according to the invention is described above in connection with detecting and tracking a vehicle, the device is principally suited for detecting and tracking any movable objects such as, for example, containers for storing and transporting goods. In the case of a container, it is possible, for example, to activate instead of a vehicle blockage, an additional safety measure in order to make it difficult to open the container.

Further advantages and possibilities of use of the present invention arise from the following description in connection with the exemplary embodiments illustrated in the drawings.

In the description, in the claims and in the abstract, the terms and associated reference numbers listed in the reference list below are used.

BRIEF DESCRIPTION OF THE DRAWING FIGURE

In the figures:
FIG. 1 shows a block diagram of a device for detecting and tracking vehicles according to the invention.

DETAILED DESCRIPTION

In the following description, identical, functionally identical and functionally connected elements may be provided with the same reference numbers. Absolute values are given in the following only as an example and are not to be understood as limiting the invention. The following exemplary embodiment is explained in connection with the GNSS GPS although the invention can principally also be used with other GNSS such as GLONASS or Galileo, or with other detection methods, for example detection methods based on mobile radio.

The GPS-based device 10 for detecting and tracking vehicles shown in FIG. 1 can be installed, for example, in a vehicle such as a passenger car or truck, an airplane, a ship or a container for transporting goods. For this purpose, the device 10 can be configured as an electronic module with its own power supply through a battery or with an external power supply through an on-board power supply of the vehicle, and can be integrated in a housing. Alternatively, the device 10 can also be configured as a chipset for integration, for example, in an electronic control unit ECU (Electronic Control Unit).

The device 10 has a GPS position-determining device 12 comprising a GPS receiver 20 and a (non-illustrated) processor for position determination based on GPS data. The GPS receiver 20 receives from the GPS satellites SAT GPS signals with GPS data for position determination by the processor. Furthermore, the GPS receiver 20 receives measurements of a distance meter 22 and a speedometer 24 that are installed in the vehicle and are used for determining a traveled distance and the current vehicle speed.

The device 10 further comprises a mobile radio communication module 14 that can establish a mobile radio connection 18 with an external vehicle detecting and tracking server 16, in particular by establishing a mobile radio data connection to the server 16, for example via the Internet, through which a data exchange between the device 10 and the server 16 can take place.

Furthermore, the device 10 comprises an (optional) jamming/spoofing detector 26 for detecting jamming or spoofing, and an action triggering unit 28 which can be controlled by the GPS position-determining device 12 and the jamming/spoofing detector 26 in order to trigger a certain action of the mobile radio communication module 14, as described in more detail hereinafter.

During normal operation without detected jamming or spoofing in the region of the device 10, the GPS position-determining device 12 periodically determines at a certain predetermined times, e.g., each minute or continuously, from the GPS signals received by the GPS receiver 20 from the satellites SAT the current position of the vehicle and transmits this position to the action triggering unit 28, for example together with a status flag "ok" for an undisturbed detection. The unit 28 can temporarily store or erase the received positions, or transmits them to the mobile radio communication module 14 together with a control command for transfer to the server 16. Conversely, the server 16 can also transmit a request for transferring the current vehicle position via the mobile radio connection 18 to the mobile radio communication module 14, which requests the current position from the action triggering unit 28 or from the GPS position-determining device 12 and after receipt of the position sends the position as a response back to the server 16 via the mobile radio connection 18.

During a disturbed operation, i.e., when a jamming or spoofing transmitter 30 emits interfering signals 30 in the region of the device 10, for example an interfering transmitter positioned in the vehicle, the GPS receiver 20 of the GPS position-determining device 12 can detect the interference in different ways, wherein individual or a plurality of these ways can be implemented in the device 10. In the exemplary embodiment described below, all types of detection of the interfering transmitter 30 are implemented.

The receiver 20 is configured such that it evaluates the receive signal strength (field strength) of all radio signals received by transmitters. For this purpose, the receiver 20 compares the field strength of the GPS signals received from the GPS satellites SAT and the interfering signals received from the interfering transmitter 30 with each other. In the case of noticeable deviations, the receiver 20 detects an interfering transmitter, for example, if the receiver determines based on the comparison that the receive field strength of the interfering signals of the interfering transmitter 30 is greater than the one of the GPS signals of the satellites SAT. Furthermore, the receiver 20 measures the carrier-to-noise density ratio of the received signals and classifies signals that, compared to the other signals, have a particularly high carrier-to-noise density ratio as interfering signals. Finally, the receiver 20 also evaluates the statistical distribution of the samples of the received signals provided by its front-end in order to detect interfering signals which show a statistical distribution of their samples which usually deviates from the GPS signals of the satellites SAT. Each time when the monitored measured values indicate an interfering signal, the GPS receiver 20 outputs a signal which signalizes the detection of an interfering signal.

Furthermore, the receiver 20 is configured for measuring the time period during which it can detect and track no GPS signals of the satellites SAT at all, and thus cannot perform a position determination. For this purpose, the receiver 20 starts an internal timer as soon as it can detect no GPS signal at all. The timer runs for a predetermined time period and is reset by the receiver 20 when the receiver detects a GPS signal. If the timer is not reset prior to the end of the predetermined time period, the timer outputs the signal which signals the detection of an interfering signal.

With the above-described technologies, the receiver 20 is able to detect jamming transmitters that generally interfere with, in particular impair, the reception of the GPS signals of the satellites SAT. For detecting spoofing transmitters, the receiver 20 is further configured as described in the following.

The receiver 20 comprises RAIM technology by means of which the receiver checks measurements of all received GPS signals for consistency. If by using the RAIM technology it is found that a GPS signal is not consistent with the other GPS signals, the receiver 20 again outputs the signal that signals the detection of an interfering signal. As RAIM technology, one of the technologies known and already used in some GPS receivers can be used.

In order to ensure an even more accurate detection of interfering spoofing signals, the receiver 20 further compares the measurements of the GPS signals, in particular the information determined therefrom such as speed and moving direction, with the measurements of a speedometer and a distance meter. If the receiver 20 finds significant deviations between the measurements of a GPS signal and the measurements of the sensors, the receiver outputs the signal which signalizes the detection of an interfering signal.

The signal that is output by the GPS receiver 20 and that signals the detection of an interfering signal causes the status flag for an undisturbed detection in the GPS position-determining device 12 to be set to "not ok".

As soon as the action triggering unit 28 receives from the GPS position-determining device 12 the status flag for undisturbed detection set to "not ok", or the jamming/spoofing detector 26 signalizes a detected interfering transmitter 30 to the action trigger device, the latter triggers a predetermined action as follows.

First, it outputs a blocking signal 32 that is transmitted to an engine control of the vehicle and turns off the engine of the vehicle and blocks the start of the engine until the blocking is released by receiving an authentication signal 34.

Furthermore, the triggering unit 28 transmits a command to the mobile radio communication module 14 to inform the service server 16, via the mobile radio channel 18, that an interfering transmitter 30 has been detected. By means of the mobile radio channel and the mobile radio connection between the mobile radio communication module 14 and a base station of the mobile radio network through which the mobile radio connection has been established, the service server 16 can determine the approximate location of the vehicle, for example based on the position of the base station.

The present invention enables an improved detection and tracking of vehicles or transport containers for goods in that an interfering transmitter is detected and subsequently, a certain action is triggered, for example, a message is transmitted via an undisturbed communication channel such as a mobile radio channel so that further measures for detecting the vehicle or transport container can be initiated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE NUMBERS AND ACRONYMS

10 GPS-based vehicle detecting and tracking device
12 GPS position-determining device
14 Mobile radio communication module
16 Vehicle detecting and tracking service server 18 Mobile radio channel
20 GPS receiver
22 Distance meter
24 Speedometer
26 Jamming/spoofing detector
28 Action triggering unit
30 Interfering transmitter
32 Blocking signal
34 Authentication signal
GNSS Global Navigation Satellite System
GPS Global Positioning System
RAIM Receiver Autonomous Integrity Monitoring
SAT GPS satellite

What is claimed is:

1. A device for detecting and tracking vehicles, comprising:
   a position-determining device configured to determine a current vehicle position;
   a transmitting device configured to transmit the current vehicle position to a receiver via a communication channel;
   means for detecting an activated interfering transmitter; and
   means for triggering an action depending on the detection of an activated interfering transmitter,
   wherein the means for detecting the activated interfering transmitter comprises a receiver configured to receive position-determining signals of a satellite navigation system, wherein the receiver is integrated in the position-determining device, wherein the receiver is configured to monitor one or a plurality of receive parameters of received position-determining signals in order to detect the interfering transmitter that influences the receive parameters.

2. The device according to claim 1, wherein the receiver is configured to detect the interfering transmitter due to the receiver not being able to perform a position determination during a predetermined time period.

3. The device according to claim 1, wherein the receiver is configured to check measurements of position-determining signals for consistency using RAIM technology.

4. The device according to claim 1, wherein the receiver is configured to compare measurements of position-determining signals with measurements of a distance meter or a speedometer, in order to be able to identify significant deviations that indicate use of the interfering transmitter.

5. The device according to claim 1, wherein the means for triggering the action depending on the detection of the activated interfering transmitter is configured to transmit, using the transmitting device, a message about the detected interfering transmitter via the communication channel, which is a mobile radio channel.

6. The device according to claim 1, wherein the means for triggering the action depending on the detection of the activated interfering transmitter is configured for initiating a blockage of a function of the vehicle.

7. The device according to claim 6, wherein the means for triggering the action depending on the detection of the activated interfering transmitter is further configured to request authentication for releasing the blockage of the function of the vehicle.

8. A method for detecting and tracking vehicles, comprising:
   determining, using a position-determining device, a current vehicle position;
   transmitting, using a transmitting device, the current vehicle position to a receiver via a communication channel;
   detecting an activated interfering transmitter; and
   triggering an action depending on the detection of an activated interfering transmitter,
   wherein the detection of the activated interfering transmitter comprises
      receiving, by a receiver configured to receive position-determining signals of a satellite navigation system, position-determining signals; and
      monitoring, by the receiver configured to receive position-determining signals, one or a plurality of receive parameters of received position-determining signals in order to detect the interfering transmitter that influences the receive parameters, wherein the receiver is integrated in the position-determining device.

9. The method according to claim 8, wherein the detection of the activated interfering transmitter comprises:
   detecting the interfering transmitter due to the receiver not being able to perform a position determination during a predetermined time period.

10. The method according to claim 8, wherein the detection of the activated interfering transmitter comprises:
    checking measurements of the position-determining signals for consistency using RAIM technology.

11. The method according to claim 8, wherein the detection of the activated interfering transmitter comprises:
    comparing measurements of position-determining signals with measurements of a distance meter or a speedometer in order to be able to identify significant deviations that indicate use of the interfering transmitter.

12. The method according to claim 8, wherein the triggering of the action depending on the detection of the activated interfering transmitter comprises transmitting, using the transmitting device, a message about the detected interfering transmitter via the communication channel, which is a mobile radio channel.

13. The method according to claim 8, wherein the triggering of the action depending on the detection of the activated interfering transmitter involves initiating a blockage of a function of the vehicle.

14. The method according to claim 13, wherein the method further comprises requesting authentication for releasing the blockage of the function of the vehicle.

* * * * *